J. W. SURSA.
Plow Beam.
No. 107,560. Patented Sept 20, 1870.
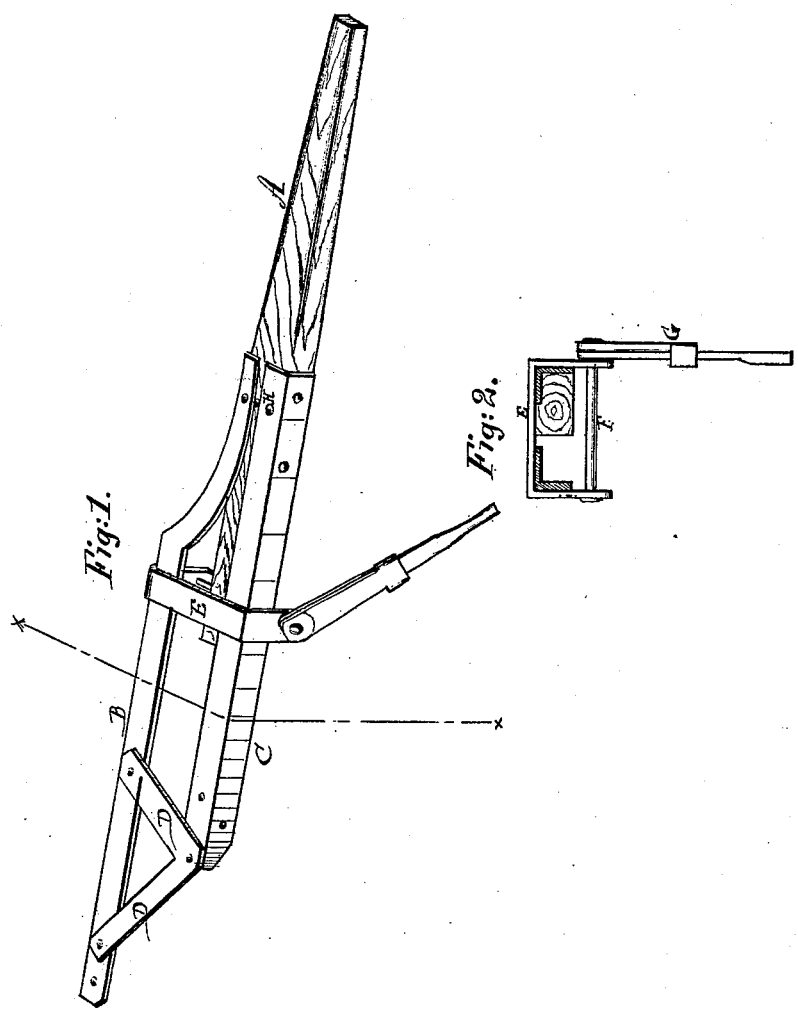

United States Patent Office.

JAMES W. SURSA, OF SAN FRANCISCO, CALIFORNIA.

Letters Patent No. 107,560, dated September 20, 1870.

IMPROVEMENT IN GANG-PLOW BEAMS.

The Schedule referred to in these Letters Patent and making part of the same.

*To all whom it may concern:*

Be it known that I, JAMES W. SURSA, of San Francisco, in the county of San Francisco and State of California, have invented a new and useful Improvement in Plow-beams; and I do hereby declare that the following is a full, clear, and exact description thereof, which will enable others skilled in the art to make and use the same, reference being had to the accompanying drawing forming part of this specification.

This invention relates to a new and useful improvement in beams for plows, more especially designed for gang-plows, but applicable to other kinds of plows; and consists in making the beam or beams of angle-iron, as hereinafter more fully described.

In the accompanying drawing—

Figure 1 represents a perspective view of the beams designed for a gang-plow.

Figure 2 is a cross-section on the line $x\ x$.

Similar letters of reference indicate corresponding parts.

A is the tongue to which the beam is attached.

B is the long beam, which is curved, at its forward part, so as to reach onto and be fastened to the tongue. The rear portion of the tongue is square, and the forward portion of the beam fits onto the upper left-hand angle.

C is the short or right-hand beam, which is straight, the forward portion fitting the upper right-hand angle of the tongue, as seen in the drawing.

These beams are securely fastened to the tongue by bolts, and are connected together, at their rear ends, by means of one or more diagonal braces, D, as represented.

E is a strap, which is securely bolted to the rear end of the tongue, with its ends bent down over and below both beams, as plainly seen in fig. 2.

F is a bolt, which passes through the ends of the strap, and connects the hinge of my plow, and, also, the lever and spring G.

The plows proper are attached to the beams in the ordinary manner.

H represents vertical holes, three, more or less, by which the plows are adjusted to or from the land.

By making a gang-plow in this manner, both lightness and strength are secured, as it is well known that a given weight of iron, in the form of angle-iron, will resist lateral and vertical pressure or strain with greater force that when in any other form. When the beams of a gang-plow are formed of this iron, and securely tied together and braced, and bolted to the tongue, as shown in the drawing, little is left to be desired as regards strength, lightness, and durability.

Having thus described my invention,

I claim as new and desire to secure by Letters Patent—

1. The long beam B, short beam C, and brace D, combined with the tongue A, as and for the purpose described.

2. The arrangement of angular brace D, and angle-clip E F, as and for the purpose described.

J. W. SURSA.

Witnesses:
SAML. S. MURFEY,
G. T. VINCENT.